United States Patent
Frey

(10) Patent No.: US 9,022,708 B2
(45) Date of Patent: May 5, 2015

(54) SEAT FIXING DEVICE

(75) Inventor: Andreas Frey, Immenstaad (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 1145 days.

(21) Appl. No.: 11/660,407

(22) PCT Filed: Aug. 11, 2005

(86) PCT No.: PCT/EP2005/008705
§ 371 (c)(1),
(2), (4) Date: Feb. 16, 2007

(87) PCT Pub. No.: WO2006/037397
PCT Pub. Date: Apr. 13, 2006

(65) Prior Publication Data
US 2008/0149764 A1 Jun. 26, 2008

(30) Foreign Application Priority Data
Sep. 30, 2004 (DE) .......................... 10 2004 047 455

(51) Int. Cl.
*B60P 7/08* (2006.01)
*B64D 11/06* (2006.01)

(52) U.S. Cl.
CPC ............. *B64D 11/0696* (2013.01); *Y02T 50/46* (2013.01)

(58) Field of Classification Search
USPC ........ 244/122 R, 118.6, 118.5; 248/424, 429, 248/500, 501, 503.1, 119; 410/85, 102, 410/105; 296/65
See application file for complete search history.

(56) References Cited

U.S. PATENT DOCUMENTS

| 3,241,501 | A | | 3/1966 | Watts | |
|---|---|---|---|---|---|
| 3,570,415 | A | * | 3/1971 | Drinnon et al. | 248/501 |
| 3,620,171 | A | * | 11/1971 | Brenia | 410/105 |
| 4,213,593 | A | | 7/1980 | Weik | |
| 4,787,577 | A | | 11/1988 | Whittle | |
| 4,796,837 | A | * | 1/1989 | Dowd | 244/122 R |
| 5,489,172 | A | * | 2/1996 | Michler | 410/105 |
| 5,871,318 | A | * | 2/1999 | Dixon et al. | 410/105 |
| 7,695,225 | B2 | * | 4/2010 | Pozzi | 410/105 |
| 2005/0180836 | A1 | * | 8/2005 | Dowty | 410/105 |
| 2006/0104740 | A1 | * | 5/2006 | Girardin et al. | 410/105 |

FOREIGN PATENT DOCUMENTS

DE 195 20 959 12/1996

* cited by examiner

*Primary Examiner* — Brian M O'Hara
(74) *Attorney, Agent, or Firm* — Posz Law Group, PLC

(57) ABSTRACT

A seat fixing device for fixing an air passenger seat to a floor of an aircraft includes at least one fastening rail (10) in the form or a hollow profile, which is provided with a longitudinal channel (14) delimiting the free flanks (16) of the profile on the top part thereof (12) oriented to the seat. The channel includes through openings (18) located in a predetermined modular dimension, which enlarge the free input section and are used for inserting at least one snap-locking part (24) of a locking body (26). The looking body (26) is movable to a clamping position with the profile (16) of the hollow profile (14) by the relative displacement of each snap-locking part (24) in a perpendicular direction with respect to the longitudinal axis (28) of the fastening rail (10). The fixing device provides an eccentric drive (30) of the locking body (26) for carrying out relative displacement, which reduces assembly costs.

13 Claims, 2 Drawing Sheets

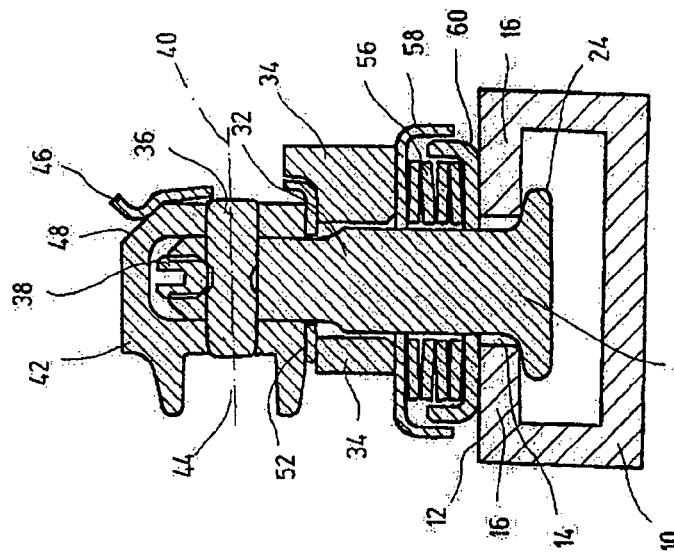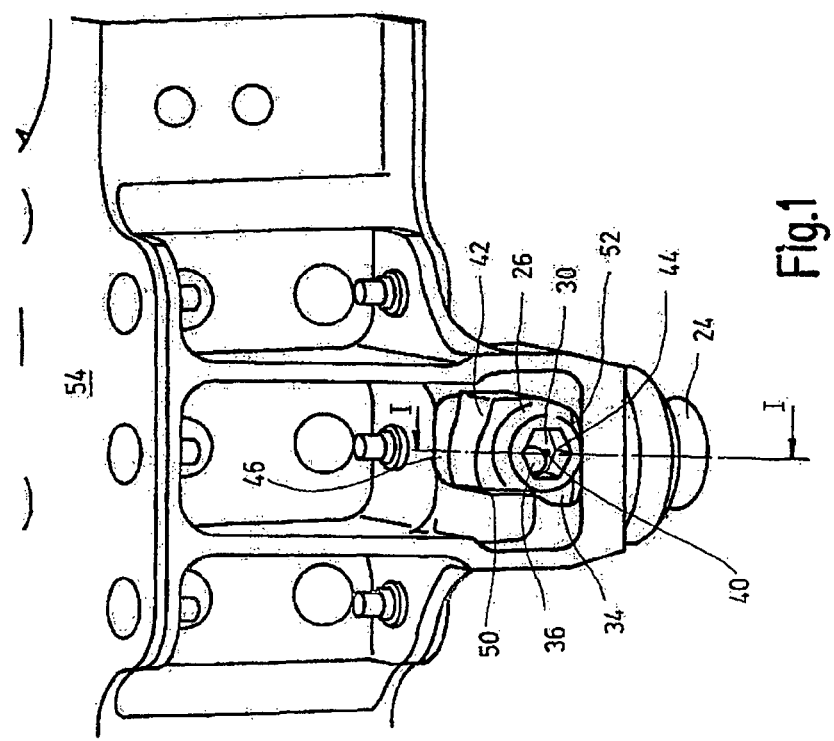
Fig.1
Fig.2

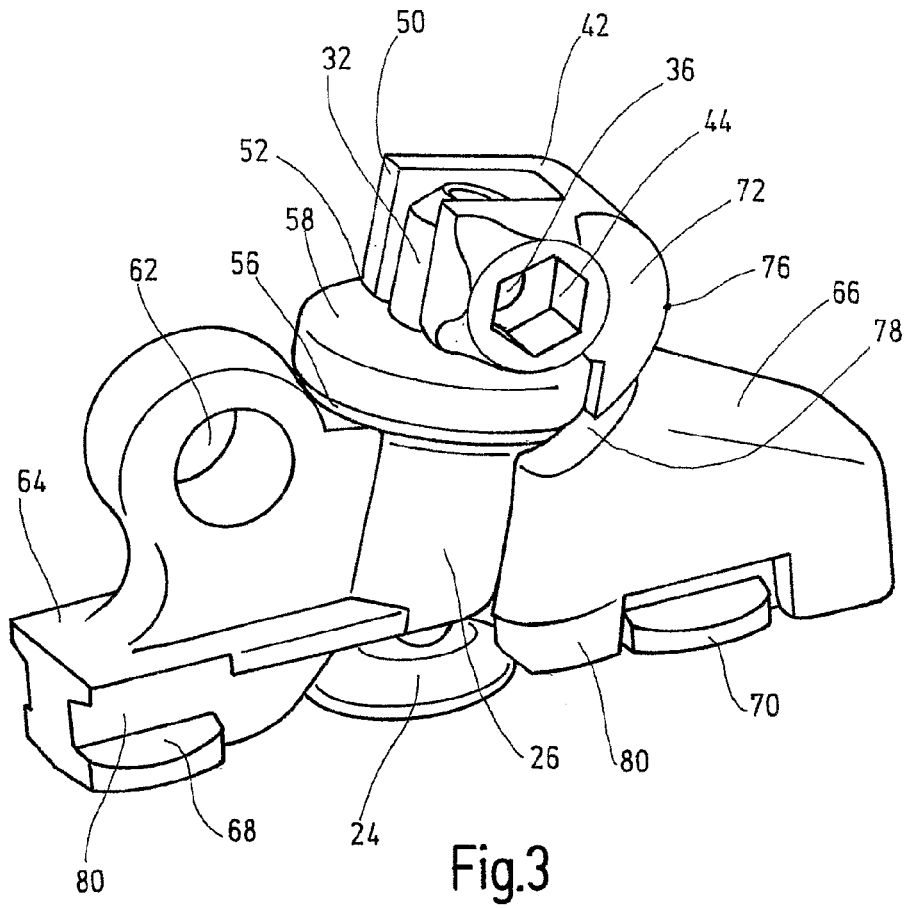
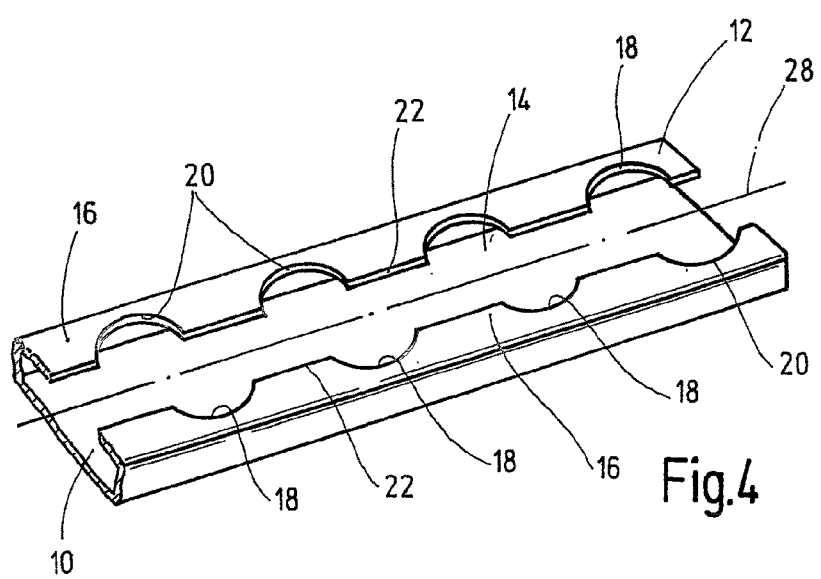

SEAT FIXING DEVICE

BACKGROUND OF THE INVENTION

The invention relates to a seat fixing device, in particular for anchoring aircraft passenger seats to the floor of an aircraft that has at least one attachment rail that is designed in the form of a hollow section, which is provided on its top side facing the aircraft passenger seat with a longitudinal channel that is limited by the free section sides of the hollow section, wherein said longitudinal channel has through openings that expand its free input cross-section in a presettable grid measure, wherein said through openings are used in the passage of at least one catch part of a locking element, which can be brought into clamping contact with the section sides of the hollow section in a relative movement of the respective catch part transverse to the longitudinal axis of the attachment rail.

Seat anchoring devices and systems such as these are used to configure aircraft passenger seats in a presettable installation pattern with presettable intervals in the longitudinal direction of the aircraft and to equip such an aircraft cabin with seats. In this case, several attachment rails in the floor of the cabin run in multiple rows next to one another in longitudinal direction of the aircraft body. In this case, at regular intervals, an aircraft passenger seat or a series of aircraft passenger seats configured next to one another is hinged securely as a seating unit with its pedestal feet on the attachment rails according to the presettable seat configuration pattern, in longitudinal direction of the pedestal feet, two pairs of foot components being detachably secured by means of so-called catching elements to two attachment rails that are parallel to one another. Further, loads can also be lashed down and thus secured within the aircraft cabin with the pertinent seat anchoring devices.

In the known solutions of seat anchoring devices, as they can be freely obtained on the market, one basic element has an attaching part to attach to the attachment rail as well as a fastening eye on its top side opposite the attachment rail to secure an attachment pin of the respective pedestal foot for the aircraft passenger seat. On its side facing the attachment rail, the basic element has the catch parts facing each other in pairs in the longitudinal direction with disk-shaped cross-sections, which are to be engaged at intervals from one another in the longitudinal direction of the basic element with the through openings of the attachment rail. The basic element with its catch parts can thus be partially inserted into the through openings, and by virtue of the basic element moving longitudinally relative to the fixed attachment rail by one grid square, the catch parts firmly engage in the through openings from below with the free section sides of the hollow-section-like attachment rail. On the opposite side, the known solution has a crosspiece-like expansion on the basic element, this expansion on the top side supporting the section sides of the attachment rail and overlapping through openings configured between the two pairs of catch parts of the basic element.

In the known solutions, the respective basic element then has an attaching part, which is also referred to as "plunger" in technical terminology, which can be moved back and forth by means of an attachment device of the basic element transverse to the longitudinal movability, whereby in the lowered position, other catch parts of the attaching part engage precision-fitted in the corresponding through openings of the section bars and the attaching part is secured in longitudinal direction in its position on the attachment rail, which otherwise is secured against vertical lifting by the catch parts, which engage below the free section sides of the attachment rail. By tightening an anchoring means of the attachment device, the other catch parts of the attaching part (plunger) are then, on the one hand, definitively fixed in their position on the attachment rail, and, moreover, the other catch parts of the basic element are clamped against the section sides of the hollow chamber-like attachment rail, such that a more secure holding of the basic element on the attachment rail is achieved both in axial direction and in radial direction.

A seat anchoring system is known by U.S. Pat. No. 3,241,501, in which the catch parts of a basic element can be engaged without further relative movement along the longitudinal direction of the attachment rail with the corresponding recesses within two adjacent section sides of the hollow section as an attachment rail. A plate-like attaching part, which is provided on its lower side with other catch parts that engage in the free through openings that expand the input cross-section by a presettable grid measure in the attachment rail, is rigidly connected to this basic element. Another catch part configured in the middle, as a component of an activating pin, is placed so that it can move axially lengthwise in the basic element between the two other catch parts of the basic element via a loop handle and against the spring force of a compression spring from a basic position, in which the other center catch part, when engaged, can be pulled out into an activation position, with the through opening corresponding thereto, a position in which a pinion gear of the activating pin engages with pinion gears of the adjacent catch parts of the basic element.

If the handle tube is now pivoted by hand by 90°, the above-mentioned pinion gear drive is activated and the catch parts of the basic element are pivoted over this pinion gear drive into a locking position transverse to the longitudinal direction of the attachment rails, in which tapering base parts of the catch parts engage under the respective section sides of the hollow section as attachment rails. In the pertinent locking position, at least the other catch parts of the attaching part configured on the outside are then engaged with the through openings in the expanded cross-section. A dismantling process of the seat anchoring system from the corresponding attachment rail is correspondingly possible in reverse sequence as described. Although this known solution has the advantage that the attaching system can be attached directly to the rail without further longitudinal movement in the longitudinal direction of the attachment rails, the pivoting of the catch parts of the basic element by 90° from an initial position is necessary for the actual locking process, such that obstructions to progress come into operation or even result in damage to the relatively sensitive section sides of the hollow section, in particular if the latter should be composed of light metal materials for weight reasons.

Although in the above-described known solutions, a more reliable dispersion of crash forces, which can act on the aircraft passenger seat, is achieved in the floor structure of the aircraft cabin with its attachment rails, the increased assembly costs that result in practical applications are disadvantageous and the existing systems are not suitable for a frequent installation or modification. Also, as indicated in the foregoing, malfunctions by obstructions in operation are not ruled out and with respect to the structurally, partially complicated design, the known systems are costly in production.

SUMMARY

On the basis of this prior art, the object of the invention is based on further improving the known seat anchoring devices and systems such that they are produced economically and can be mounted simply and reliably with a simultaneous increase of the seating comfort for a seat that is secured in this way on a cabin floor.

In that, an eccentric drive of the locking element is provided for the above-mentioned relative movement of the respective catch part transverse to the longitudinal axis of the attachment rail, the existing devices and systems are further improved to the extent that the assembly costs can be reduced on site and in particular in the case of frequent installation and modification measures, the advantages of the anchoring device according to the invention clearly emerge. Via a pivoting process that is simple to put into operation in the locking element, a reliable mechanical locking between the latter and the attachment rail can be created. In particular a friction connection between the locking element and the attachment rail is obtained.

With low activating forces and the property of being safe for materials, the eccentric drive of the locking element always allows specifically defined securing and detaching options for the seat anchoring device on the attachment rail. Since the eccentric drive of the locking element occupies a clearly recognizable position in its detached or its locked position, a plausibility test can be performed optically quickly, whether or not the seat anchoring is active or not, which benefits the requirements for increased reliability. The seat anchoring device according to the invention requires few movable components and thus is designed small and can be produced economically based on the small variety of parts. Also, a savings in weight can be achieved in this way.

In a preferred embodiment of the seat anchoring device according to the invention, the eccentric drive has a rod-shaped activating part, one free end of which is connected to the catch part, and the area of its other free end is penetrated by another activating part, which engages outside the swivel axis in an eccentric bushing, which in the case of its pivoting motion from a release position into an attachment position via the two activating parts, the respective catch part expands by the above-mentioned relative movement that secures it by tensioning against the section sides of the hollow section. Because of the eccentric drive, an over-centering of the provided catch parts and activating parts in the locking or securing position is possible, so that in this way, accidental detachment can be safely avoided even in the case of oscillations and shocks introduced into the system—even in the event of a crash—occurring.

In another especially preferred embodiment of the seat anchoring device according to the invention, at least one attaching part in addition to the locking element is present, which has at least one other catch part on its side facing the respective catch part, which is one grid distance measurement away from the one respective catch part, which unlike the distance measurement of the through openings is in the hollow section of the attachment rail. By employing or adding at least one other attachment part to the other components of the seat anchoring device, it is possible to further develop the described eccentric solution in such a way that an attachment possibility for the so-called "rear stud" area is created. The rear stud area, viewed in the direction of flight, relates to the rear attachment area of the pedestal legs of the aircraft passenger seat, where, because force is applied obliquely, owing to the inclined position of the pedestal legs, especially large forces that arise in the event of a crash can be expected. By the at least one other attachment part, a reliable introduction of force into the floor structure via the hollow section bars is then achieved.

In another especially preferred embodiment of the seat anchoring device according to the invention, an energy reservoir is present, which discharges oscillations or shocks into the respective attachment rail. It is preferably provided in this case that the energy reservoir is formed from at least one plate spring, which on the one hand is supported on an eccentric drive, and on the other hand on stationary parts such as housings, rail parts, etc. The indicated energy reservoir allows the equalization of tolerances, such that the fitting in the form of the seat anchoring device is always closely abutting the attachment rail. In this way, the implementation of the so-called anti-rattle function is also made possible, which clearly contributes to increasing the seating comfort for the passenger.

Other advantageous embodiments of the seat anchoring device will be apparent from the claims.

Below, the seat anchoring device according to the invention will be explained in more detail based on two embodiments according to the drawing.

BRIEF DESCRIPTION OF THE DRAWINGS

In diagrammatic form and not drawn to scale,

FIG. 1 shows a perspective elevational view of a portion of the seat anchoring device as a so-called "front stud" solution;

FIG. 2 shows a longitudinal section through the subject matter according to FIG. 1 along the line I-I;

FIG. 3 shows a perspective elevational view of a portion of a second embodiment of the seat anchoring device according to the invention, and FIG. 4, in perspective elevational view, shows a cross-section of the attachment rail that is formed as a hollow section, as it runs below the floor in the cabin floor area, for example of an aircraft in a multiple side-by-side configuration.

DETAILED DESCRIPTION OF THE PREFERRED EMBODIMENTS

The seat anchoring device according to the invention with its two embodiments according to the depictions of the figures is used in particular for attaching aircraft passenger seats (not shown) to a floor (cabin floor) of an aircraft. The seat anchoring device in question can also, however, optionally be used in other areas, for example in the area of vehicles such as motor coaches, ferries, etc., but it also can be used within the framework of hall seating, for example for a meeting hall, theater seating, etc. Further, the seat anchoring device can also be used for lashing loads, luggage or other goods to be transported by means of aircraft and vehicles of any type.

The seat anchoring device has an attachment rail 10 (cf. FIG. 4), which is designed as a hollow section. A plurality of such attachment rails 10 preferably run in longitudinal direction of the cabin floor of an aircraft, the respective attachment rail 10 being integrated with its top side 12, preferably flush in the cabin floor of an aircraft. The top side 12 of any attachment rail 10 thus merges flush with the top side of the cabin floor. Two or more attachment rails 10 running parallel to one another then are used in the installation of aircraft passenger seats inside the aircraft cabin, whereby an individual aircraft passenger seat or several aircraft passenger seats configured in series with respect to one another can be connected to the floor as a whole with the attachment rails 10 via the seat anchoring device according to the invention.

If the respective aircraft cabin is to be used to transport loads, the possibility exists, as already indicated above, of removing the seats again and being able to introduce not only aircraft passenger seats on the attachment rails 10 via the seat anchoring system, to be described in still more detail, but analogously lashing loads in the cabin via the attachment rails 10. In addition, the seat anchoring system according to the invention can be used to attach an aircraft passenger seat with only one pedestal foot, or, if the pedestal design of the seat has several seat legs, to thus attach the latter in the front area as well as in the rear area of a seat on the cabin floor.

On its top side 12, the above-mentioned hollow section of an attachment rail 10 limits a longitudinal channel 14, which is limited by the two free section sides 16 of the hollow section that face one another. In a presettable grid measure, the longitudinal channel 14 in question has its free through openings 18 that expand the input cross-section, the through openings 18 being preferably at a uniform distance from one another. The through openings 18 are preferably designed as holes and end with adjacent, opposite, arc-shaped circular segments 20 in the free ends of the section sides 16, which form a longitudinal edge 22 on both sides of the longitudinal channel 14 with its input cross-section.

The through openings 18 indicated in the foregoing are used in the passage of at least one catch part 24 of a locking element 26, which can be brought into clamping contact in a relative movement of the catch part 24 (cf. FIGS. 1 and 2) transverse to the longitudinal axis 28 of the attachment rail 10 with the section sides 16 of the hollow section. For the above-mentioned relative movement, an eccentric drive 30 of the locking element 26 is provided.

In particular, FIG. 2 shows that the eccentric drive 30 has a rod-shaped activating part 32, which can be moved longitudinally in the axial direction in a housing part 34 of the locking element 26, viewed in the direction of looking at FIG. 2 and can be moved back and forth. The catch part 24 is connected at the one lower free end of the activating part 32 that is viewed in the direction looking at FIG. 2, and in the area of the other free end of the activating part 32, the latter is penetrated by another pin-shaped activating part 36, which is secured in the activating part 32 by a locking screw 38 and which engages in the latter outside of the swivel axis or axis of rotation 40 of an eccentric bushing 42. When the eccentric bushing 42 pivots around its swivel axis 40 that is configured in the middle from a release position into an attachment position according to the depiction in FIG. 2, the catch part 24 is clamped securely against the section sides 16 of the hollow section via the two activating parts 32, 26 by the above-mentioned relative movement.

For its pivoting, the eccentric bushing 42 has a handle, which, according to the first embodiment of FIGS. 1 and 2, is made in the form of a possible means of gripping for an activating tool, for example in the form of an inside hexagonal wrench (not shown). To this end, viewed in the direction looking at FIG. 1, the means of gripping option for the activating tool is provided to the front side of the eccentric bushing 42 facing the observer in the form of an inside hexagonal recess 44. In addition, a catch device 46 is provided, which has a flexible catch plate, which secures the latter in presettable pivoting positions of the eccentric bushing 42, whereby according to the depiction of FIG. 2, this catching is done in the locking position and an upper recess of the catch plate adjoins a rear beveling 48 of the eccentric bushing 42. Instead of the catch device 46 that is shown, another stopping device could also be used here. By an appropriate pivoting of the eccentric bushing 42, the pertinent catching can be released in any case with the usual manual activating forces. The possibility optionally exists to provide a such a catch both in the attachment position and in the release position of the catch part 24 of the seat anchoring device, thus to achieve a defined end-position situation.

In addition, the eccentric bushing 42 on the outer periphery side has a so-called glide surface 50 as well as a subjacent attachment surface 52 running transverse thereto. These surfaces facilitate the alternation from the release position into the locking position and vice versa. If, for example, the locking of the locking element 26 is to be released in the direction looking at FIG. 1, the attachment surface 52 is rotated counter-clockwise with the inside hexagonal wrench against the application of action by the catch device 46 (spring plate) toward the right, and the left glide surface 50 enters into the position of the attachment surface 52 in its locking position. In this pivoting of the eccentric bushing 42, the activating part 32 is pressed downward by the other activating part 36, and the catch part 24 with its two reverse grip sides is released from the section sides 16. If the originally secured locking element 26 is now moved in the direction of the longitudinal axis 28 of the attachment rail 10 with its catch part 24 by ½ grid measure between two adjacent through openings 18, the catch part 24 with its cylindrical outside periphery surface is brought out of precision-fitted engagement with the corresponding through opening 18, and the locking element 26 can be raised upward from the attachment rail 10. An attachment process for the locking element 26 can then be carried out again in reverse sequence optionally at another location. In this case, viewed in the direction looking at FIG. 1, the eccentric bushing 42 can be pivoted clockwise by 90°, the other attachment part 36 then being raised eccentrically, whereby an overcentering can be provided in such a way that the longitudinal axis of the other activating part 36 comes to lie above the swivel shaft 40 of the eccentric bushing 42. In this way, accidental detachment can be reliably avoided even when impacts or shocks occur; the catch device 46 in the already outlined framework also contributes in this regard.

The solution according to FIGS. 1 and 2 is used in particular to secure an aircraft passenger seat as the so-called front stud solution, in which a front seat or frame foot component 54 is secured in the form of a point bearing. To increase the comfort for the seat occupant, an energy reservoir 56 is present in the form of a so-called double plate spring set (cf. FIG. 2), which is able to discharge oscillations or shocks into the respective attachment rail 10 and consequently in the basic structure of the cabin floor. This energy reservoir 56 is supported, viewed in the direction looking at FIG. 2, with its upper end on a covering part 58 that overlaps it, said covering part in turn covers a lower part 60 that is curved upward, which is supported on the top side 12 of the attachment rail 10 in the locking position of the seat anchoring device. The top side of the cover part 58 is supported in turn on the housing part 34 of the seat anchoring device. Because of the cover parts 58 and 60 that interlock regardless of the position of the energy reservoir 56, the plate spring set is protected from contamination, and there is thus no danger of injury to an installer.

In the other embodiment according to FIG. 3, the same constructional components as in the first embodiment are also provided with the same reference numbers, so that the statements previously made in the first embodiment also apply to the other embodiment according to FIG. 3. In particular, the embodiment according to FIG. 3 also has the core idea of an attachment option of the catch part 24 by means of the eccentric drive 30, whereby the embodiment according to FIG. 3 is designed as a so-called "rear stud solution" for the rear aircraft passenger seat area, so that especially obliquely introduced forces of the base of the seat can be diverted via the receiving eye 62, to which the respective associatable pedestal foot (not shown) is attached, into the floor structure. For this purpose, each locking element 26 has an attaching part 64, 66 on both sides, whereby the front attaching part 64, viewed in the direction looking at FIG. 3, bears the receiving part 62.

On its side facing the catch part 24, the respective attaching part 64, 66 has another catch part 68, 70, whose outer periphery is recreated in terms of its geometric dimensions on the outer peripheral side of the catch part 24. The grid distance measurement of the pertinent catch parts 24, 68 and 70 is unlike the distance measurement of the through openings 18 in the hollow section of the attachment rail 10. To attach the seat anchoring device according to FIG. 3, the other activating part 36 is first moved counterclockwise by pivoting the lever 72 and consequently the rod-shaped activating part 32 is moved downward, so that in this way, the axial distance between catch part 24 and lower side of the device is increased. The catch part 24 is then introduced into an associated through opening 18, the other catch parts 68, 70 resting with their two section sides facing each other on the top side 12 of the attachment rail 10. By moving axially less than ½ a distance measurement along the longitudinal axis 28 of the attachment rail 10, the catch part 24 engages with the two section sides 16 and, when the catch part 24 attaches via the eccentric drive, the other catch parts 68, 70 drop into the corresponding through openings 18 until the circular segments 20 of the corresponding through openings 18 are in contact with the free edges of the two other catch parts 68, 70 on the peripheral side.

For an activation of the eccentric drive 30, the likewise present inside hexagonal recess 44 can also be used in addition or as an alternative. The lever 72 is configured in the rear area of the eccentric bushing 42, which here with two opposite leg pieces comprises the free end of the activating part 32, whereby a convex guide surface 76 of the lever 72 can be supported on a correspondingly concave-configured glide surface 78 of the rear attaching part 66, which likewise can prevent an accidental detachment. In the attached state of the thus modified anchoring system, the two section sides 16 of the attachment rail 10 are then guided into a longitudinal channel area 80, formed from the corresponding projections of the two attachment parts 64, 66 as well as the locking element 26. In the amended solution according to FIG. 3, the plate spring set and consequently the energy reservoir 56 are configured in the upper area of the device, and the upper cover part 58 is in contact with the attaching surface 52 at the underside of the eccentric bushing 42 in its locked position shown in FIG. 3. If, for a detaching process, the eccentric bushing 42 pivots upward counterclockwise, viewed in the direction looking at FIG. 3, the attachment surface 52 slides off and the glide surface 50 facing the observer and looking toward FIG. 3 is moved to the underside and thus is in contact with the top side of the cover part 58. In addition, longitudinal holes can be provided in the so-called front stud solution in the floor-base frame as through openings 18, holes in which the respective fitting also can be moved laterally transverse to the longitudinal direction of the attachment rail. Thus, an equalization of the crosswise tolerances, which occur between the individual seat bars 10 of the floor-base frame, is possible.

With the eccentric drive according to the invention in the case of seat anchoring devices, the necessary anchoring tasks can be accomplished reliably and with very low assembly costs.

The invention claimed is:

1. A seat fixing device for anchoring aircraft passenger seats to the floor of an aircraft, comprising:
   at least one attachment rail that has, in a fixed state of an aircraft passenger seat, a top side facing the aircraft passenger seat, wherein the attachment rail is designed in the form of a hollow section, and is provided on the top side with a longitudinal channel having a longitudinal axis, wherein the longitudinal channel is limited by free section sides of the hollow section and has through openings expanding the free input cross-section of the longitudinal channel in a given grid measure;
   a locking element having at least one catch part, wherein said through openings are used for the passage of the at least one catch part and wherein the catch part can be brought into clamping contact with the section sides of the hollow section in a clamping movement of the respective catch part relative to the attachment rail and transverse to the longitudinal axis of the longitudinal channel; and
   an eccentric drive, which is part of the locking element, wherein the eccentric drive operates the clamping movement of the catch part; and
   an energy reservoir, which discharges oscillations or shocks into the respective attachment rail, compensates for tolerances and is clamped with the attachment rail, wherein the energy reservoir is formed by at least one spring, which is supported, on the one hand, on the eccentric drive, and on the other hand, on stationary parts.

2. The seat fixing device according to claim 1, wherein
   the eccentric drive has an eccentric bushing, which is pivotal about a pivot axis, and a rod-shaped activating part, and wherein one free end of the activating part is connected to the catch part and another free end of the activating part is engaged with a second activating part, which engages the eccentric bushing eccentrically with respect to the pivot axis, and
   the eccentric bushing can be pivoted in a pivoting movement from a release position into a locking position, and the pivoting movement causes, via the two activating parts, the clamping movement of the catch part that by tensioning secures the catch part against the section sides of the hollow section.

3. The seat fixing device according to claim 2, wherein the eccentric bushing has a socket, which is adapted to engage an actuation tool for pivoting the eccentric bushing.

4. The seat fixing device according to claim 2, wherein a catch device reversibly secures the eccentric bushing in predetermined pivoting positions, wherein at least one pivoting position corresponds to the locking position of the eccentric bushing.

5. The seat fixing device according to claim 2, wherein the eccentric bushing is provided at least partially on an outer periphery side with a glide surface and an attachment surface running transverse thereto, whereby said surfaces facilitate the alternation from the release position into the locking position and vice versa.

6. The seat fixing device according to claim 2, wherein
   the through openings within the hollow section have a circular cross-section, and
   the respective catch part as well as other catch parts have circular material parts that can be inserted precision-fitted into the through openings.

7. The seat fixing device according to claim 2, wherein the catch part is integrally connected to the rod-shaped activating part.

8. The seat fixing device according to claim 2, wherein the eccentric bushing is directly connected to the catch part.

9. The seat fixing device according to claim 2, wherein the second activating part is directly connected to the catch part.

10. The seat fixing device according to claim 1, wherein in addition to the locking element, at least one attaching part is present, which on its side facing the respective catch part has at least one other catch part, which is one grid distance measurement away from the one respective catch part, and which is equal to the distance measurement of the through openings in the hollow section of the attachment rail.

11. The seat fixing device according to claim 1, wherein the eccentric drive can be pivoted relative to the attachment rail about a pivot axis, which lies in a plane that is parallel to said top side of the attachment rail.

12. The seat fixing device according to claim 1, wherein the pivot axis is essentially perpendicular to the longitudinal axis of the longitudinal channel.

13. The seat fixing device according to claim 1, wherein the clamping movement is essentially perpendicular to the longitudinal axis of the longitudinal channel.

* * * * *